J. L. KENDALL & R. H. TRESTED.
Improvement in Apparatus for Molding Hollow Articles from Paper-Pulp.

No. 125,740.  
Patented April 16, 1872.

INVENTOR.  
John L. Kendall and  
Richard H. Trested  
Brown Brothers  
Attys.

WITNESSES.  
J. P. McElroy.  
R. W. Fetch Morris.

UNITED STATES PATENT OFFICE.

JOHN L. KENDALL, OF FOXBOROUGH, MASSACHUSETTS, AND RICHARD H. TRESTED, OF NEW YORK, N. Y.

IMPROVEMENT IN APPARATUS FOR MOLDING HOLLOW ARTICLES FROM PAPER-PULP.

Specification forming part of Letters Patent No. 125,740, dated April 16, 1872.

*To all persons to whom these presents shall come:*

Be it known that we, JOHN L. KENDALL, of Foxborough, in the county of Norfolk and State of Massachusetts, and RICHARD H. TRESTED, of New York city, in the county and State of New York, have invented certain new and useful Improvements in Apparatus for Molding Hollow Articles, more especially Hats, from Paper-Pulp; and that the following description, taken in connection with the accompanying drawing forming a part of the same, is a full and exact specification thereof.

The apparatus embraced by this invention is constructed of a tank or reservoir arranged in a vertical position and, by preference, open at its upper end, having within it, and at or near its lower end, a fixed mold-block of the shape of the article which it is desired to form from paper-pulp. This mold-block is made in a novel manner of wire-gauze, as will be hereinafter more particularly described, so as to permit freely water to run through it and below it. At the bottom of the tank is arranged an escape-pipe for the water passing through the mold-block, within which escape water-pipe, or a connecting-pipe thereof, is arranged a steam-jet, so that, allowing steam to rush through and out of such jet, suction will be produced to facilitate and hasten the passage of the water through the mold-block.

In the accompanying drawing our improvements in apparatus for molding hollow articles, more especially hats, from paper-pulp are illustrated—

Figure 1:
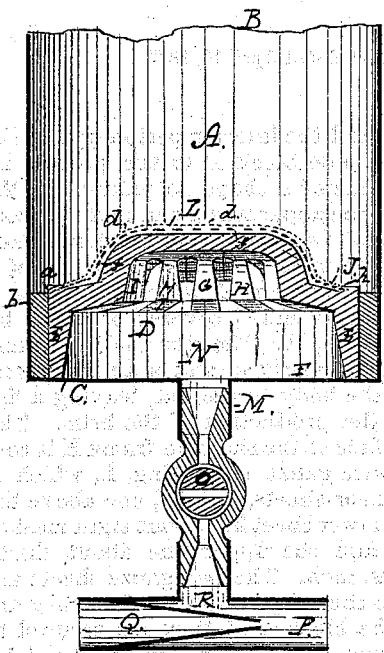
Figure 2:
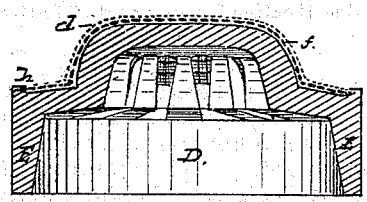
Figure 3:
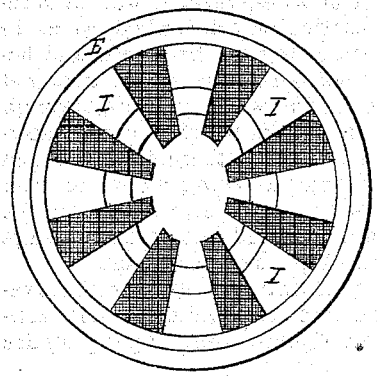
Figure 4:
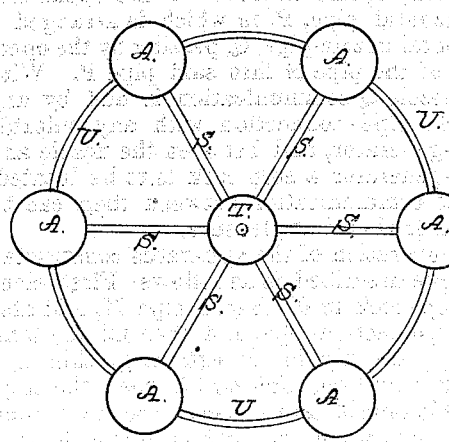

Figure 1 being a central transverse vertical section of an apparatus constructed according thereto; Fig. 2, a central vertical section of the mold-block detached; Fig. 3, a plan view of the under side to the mold-block; Fig. 4, a plan view, showing a series of mold-tanks arranged in a circle and otherwise, as will be hereinafter more particularly described.

A in the drawing represents a cylindrical vessel or tank. This vessel A is to be secured in any suitable manner in a vertical position, and at its upper end, B, is open, but at its lower is closed by a head-plate, C. D, a mold-block placed in the tank A, resting upon its lower head-plate, C, and by means of India rubber or any suitable material packed between its periphery *a* and the interior periphery *b* of the tank. This mold-block D in the present instance is made of a shape to produce in the operation of the apparatus a hat, and it is constructed as follows: The block proper is made of composition metal, and is constructed of a circular flange or ring, E, which at its end F is open and at its end G covered or closed by a skeleton-frame, H. The ribs I of this frame H are radial, or nearly so, and of an arch form, to produce the body to the hat, leaving a flat ring, J, for the production of the brim. The exterior surface of the skeleton-frame H is covered with wire gauze or netting, L, which is in two layers or sheets, *d* and *f*, one above the other. The lower sheet has about eight meshes to an inch and the upper one about thirty meshes to an inch. The two gauze sheets are pressed into the shape shown before they are placed on the block, and they are secured to the block along the periphery or edge *h* by means of any suitable solder. M, a vertical pipe attached to the center of the bottom-plate C of tank A, communicating with the space N within the mold-block D. This pipe M has a stop-cock, O, and at its lower end opens into a horizontal pipe, P, in which is arranged a horizontal nozzle-pipe, Q, passing by the opening R of the pipe M into said pipe P. With this nozzle Q communication is had by any suitable pipe-connection with any suitable steam-generator, and between the nozzle and steam-generator a stop-cock is to be located, so that communication between them can be opened or closed at pleasure.

The operation of the apparatus constructed as above described is as follows: First, close the stop-cock in discharge-pipe M, and also steam connection-pipe, and then fill the tank with paper-pulp in an extremely thin and watery condition, after which open the stop-cock O in pipe M, and also open the steam communication, when the rush of steam through the nozzle Q, it is obvious, produces a vacuum under the mold-block, sucking the water through the meshes of its wire-gauze surface, and causing a deposit or laying of the fibers of the paper-pulp upon the mold-block. The water of the paper-pulp is thus drawn off, when, being completed, close the steam-passage and remove the paper-pulp sheet which is deposited on the mold-block, and then, refilling the tank, proceed as before. The construction described of the mold-block is very essential, for were a very open wire-gauze alone used the pulp fiber would be drawn through its meshes, and therefore it is necessary to use a fine gauze or netting; but the fine netting would not of itself be strong or stiff enough, and therefore the under or more open and stouter gauze is employed. In Fig. 4 of the drawing a series of mold-block tanks, A, is shown as arranged in a circle, and as connected each and all through radial water-pipes S to and with a common center-discharge water-pipe, T. U is a common steam-pipe for the several tanks, this steam-pipe being provided at each tank with a steam-jet. It is not absolutely necessary to have the upper end of tank A open, but it is preferable, as the atmospheric pressure assists in the discharge of the water through the mold-block.

Having thus described our invention, what we claim, and desire to secure by Letters Patent, is—

1. An apparatus for molding hollow articles from paper-pulp, more especially hats, constructed of a tank, A, having a perforated mold-block located therein, and provided with a water-escape pipe, M, and steam-jet Q, substantially as and for the purpose described.

2. We also claim a skeleton mold-block, D, having wire-netting, L, in two layers, substantially as described, for the purpose specified.

The above specification of our invention signed by us this 13th day of February, A. D. 1872.

JOHN L. KENDALL.
R. H. TRESTED.

Witnesses:
ALBERT W. BROWN,
RHAIMANT SAYER.